United States Patent
Reever et al.

(10) Patent No.: US 10,330,126 B2
(45) Date of Patent: Jun. 25, 2019

(54) FAN CONTROL SYSTEM WITH ELECTRO-HYDRAULIC VALVE PROVIDING THREE FAN MOTOR OPERATIONAL POSITIONS

(71) Applicant: Caterpillar Inc., Peoria, IL (US)

(72) Inventors: Justian D. Reever, Dunlap, IL (US); Darren J. Hopf, Peoria, IL (US); Timothy L. Hand, Metamora, IL (US)

(73) Assignee: Caterpillar Inc., Deerfield, IL (US)

( * ) Notice: Subject to any disclaimer, the term of this patent is extended or adjusted under 35 U.S.C. 154(b) by 193 days.

(21) Appl. No.: 15/382,066

(22) Filed: Dec. 16, 2016

(65) Prior Publication Data

US 2018/0172030 A1    Jun. 21, 2018

(51) Int. Cl.
| | |
|---|---|
| *F15B 11/04* | (2006.01) |
| *F01P 7/04* | (2006.01) |
| *F01P 5/04* | (2006.01) |
| *E02F 9/22* | (2006.01) |

(52) U.S. Cl.
CPC ............. *F15B 11/04* (2013.01); *E02F 9/226* (2013.01); *E02F 9/2235* (2013.01); *F01P 5/043* (2013.01); *F01P 7/044* (2013.01); *E02F 9/2267* (2013.01); *F01P 2060/04* (2013.01); *F15B 2211/275* (2013.01); *F15B 2211/465* (2013.01)

(58) Field of Classification Search
CPC .................................. F01P 7/044; E02F 9/226
See application file for complete search history.

(56) References Cited

U.S. PATENT DOCUMENTS

| | | | |
|---|---|---|---|
| 4,566,479 A * | 1/1986 | Rotte | F16K 11/0708 137/312 |
| 5,884,480 A | 3/1999 | Dahl et al. | |
| 6,311,488 B1 * | 11/2001 | Maruta | F16D 31/02 60/445 |
| 6,750,623 B1 | 6/2004 | McCauley et al. | |
| 6,769,252 B2 | 8/2004 | Smith | |
| 6,959,671 B2 | 11/2005 | Nakagawa et al. | |
| 7,240,486 B2 | 7/2007 | Huang et al. | |
| 7,937,938 B2 | 5/2011 | Kuipers et al. | |

(Continued)

FOREIGN PATENT DOCUMENTS

| | | | |
|---|---|---|---|
| EP | 0809737 | 6/1999 | |
| EP | 0809737 B1 * | 6/1999 | ............ E02F 9/2025 |

*Primary Examiner* — Thomas E Lazo
(74) *Attorney, Agent, or Firm* — Leydig, Voit & Mayer, Ltd.

(57) ABSTRACT

A fan control system includes a tank, a pump, a hydraulic motor, a fan, and a control valve. The control valve is adapted to selectively direct a flow of hydraulic fluid from the pump through the control valve into a pressure control chamber of the hydraulic motor or from the pressure control chamber to the tank to vary the control pressure therein to move the hydraulic motor's swashplate between forward and reverse positions. The control valve is adapted to selectively direct hydraulic fluid from the pump into the pressure control chamber such that the control pressure therein is pressurized to an idle pressure to move the swashplate to an intermediate position between the forward and reverse positions such that the output shaft rotates at an idle rate which is less than the rotational speed of the output shaft when in the forward mode.

15 Claims, 6 Drawing Sheets

(56) References Cited

U.S. PATENT DOCUMENTS

| | | | |
|---|---|---|---|
| 8,006,813 B2* | 8/2011 | James | F16D 65/853 |
| | | | 188/264 R |
| 9,574,660 B2* | 2/2017 | Schmidt | F16H 61/423 |
| 2004/0003782 A1* | 1/2004 | Ziplies | E02F 9/226 |
| | | | 123/41.12 |
| 2005/0207899 A1 | 9/2005 | Furuta | |
| 2005/0254959 A1 | 11/2005 | Furuta et al. | |
| 2006/0062678 A1 | 3/2006 | Furuta et al. | |
| 2008/0238607 A1 | 10/2008 | Schuricht et al. | |
| 2009/0028709 A1 | 1/2009 | Dakhoul | |
| 2009/0266072 A1 | 10/2009 | Kuipers et al. | |
| 2010/0018732 A1 | 1/2010 | Daniel et al. | |
| 2010/0095909 A1 | 4/2010 | Lin et al. | |
| 2012/0060777 A1* | 3/2012 | Tikkanen | F01P 7/044 |
| | | | 123/41.11 |
| 2012/0134848 A1* | 5/2012 | Nelson | E02F 9/226 |
| | | | 417/53 |
| 2012/0328455 A1 | 12/2012 | Mann et al. | |
| 2013/0022432 A1 | 1/2013 | Spitler | |
| 2013/0153180 A1 | 6/2013 | Montocchio et al. | |
| 2013/0202452 A1* | 8/2013 | Schuette | F01P 7/044 |
| | | | 417/46 |
| 2015/0017901 A1 | 1/2015 | Pfohl et al. | |
| 2015/0040548 A1 | 2/2015 | Bieker et al. | |
| 2015/0210156 A1 | 7/2015 | Manubolu et al. | |
| 2015/0240940 A1* | 8/2015 | Schmidt | F16H 61/423 |
| | | | 60/450 |
| 2016/0115856 A1 | 4/2016 | Ge et al. | |
| 2016/0245149 A1 | 8/2016 | Johnson | |

\* cited by examiner

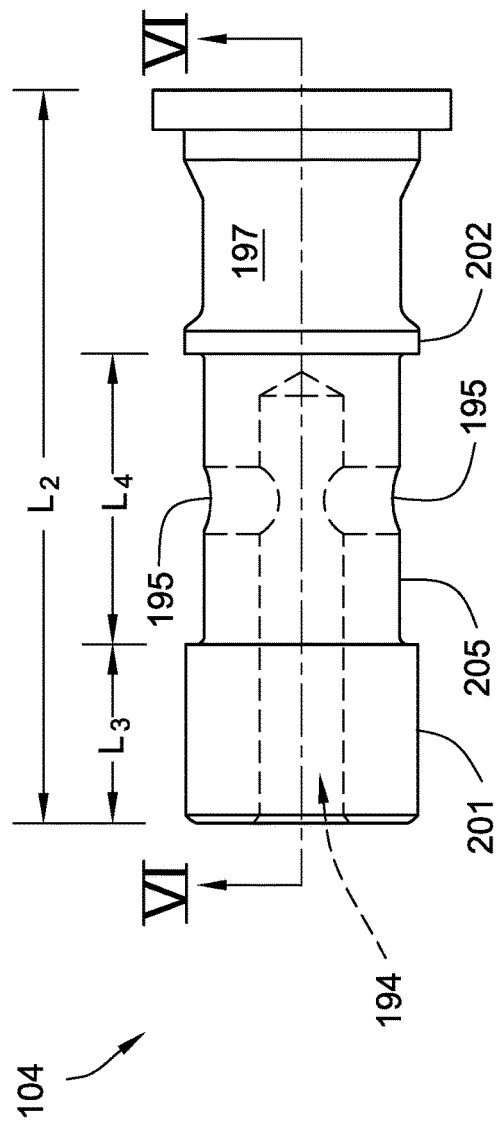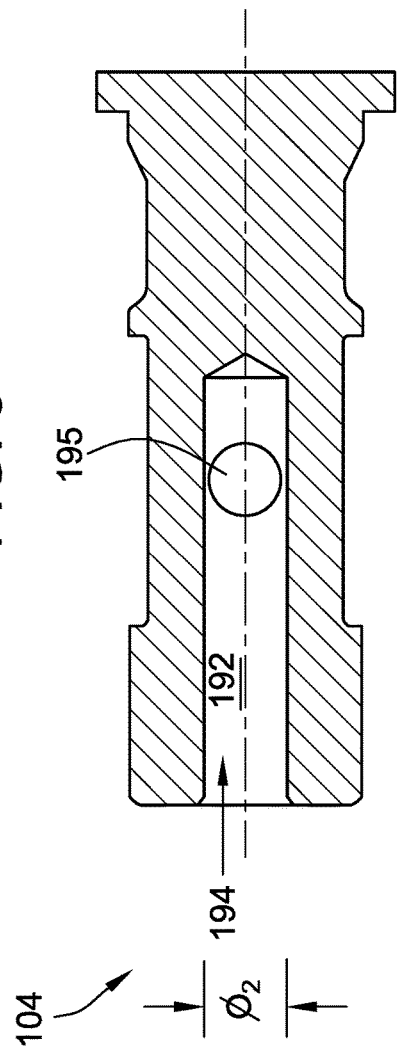

FAN CONTROL SYSTEM WITH ELECTRO-HYDRAULIC VALVE PROVIDING THREE FAN MOTOR OPERATIONAL POSITIONS

TECHNICAL FIELD

This patent disclosure relates generally to a reversible fan in an engine compartment of a machine and, more particularly, to a control system for a reversible fan that provides three motor positions.

BACKGROUND

Many types of machines that include an engine also have a radiator to supply a coolant, such as water, anti-freeze, or the like, to the engine to ensure that the engine does not overheat. The radiator is generally associated with a fan that supplies cooling air over the components of the engine, including the radiator. The radiator is typically positioned near the fan such that the fan directs air past the radiator to help cool the liquid coolant being conveyed within the radiator.

The cooling fan and engine may be housed in a shared engine compartment that includes openings to define an airflow passage through the compartment. Typically, these openings are covered with some screening material, grill, or other structure for preventing debris from entering the engine compartment. In some machines, such as tractors, off-highway trucks, compactor machines, etc., some of the blocked material can collect on these screens during machine operation, resulting in a decrease in the fan's cooling efficiency. One known strategy to address the accumulation of debris on the screen is to periodically reverse the rotational direction of the cooling fan to direct air in reverse toward the screening to dislodge any debris that may have collected on the screen surface.

In some machines, an electro-hydraulic circuit can be used to selectively switch the mode of operation of the cooling fan between forward and reverse flows. For example, U.S. Pat. No. 7,937,938 is entitled, "Hydraulic Reversing Fan Valve and Machine Using Same," and is directed to a machine that includes a hydraulic fan system for circulating cooling air through an engine compartment. When a fan reversal event is initiated, the fan motor will continue to rotate due to angular momentum even after the pump output flow has been switched from a first motor port to a second motor port. During this continued rotation as the fan decelerates to zero speed, vacuum pressure levels can arise at the first motor port, and a pressure spike can develop at the second motor port. In order to alleviate these conditions, a pressure transfer valve briefly opens to facilitate fluid flow directly from the second motor port to the first motor port as the fan motor decelerates towards zero speed before reversing direction, simultaneously alleviating vacuum and pressure spike conditions.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a fan control system for a machine. In an embodiment, a fan control system includes a tank, a pump, a hydraulic motor, a fan, and a control valve.

The tank is adapted to hold a reservoir of hydraulic fluid. The pump is in fluid communication with the tank. The pump is adapted to receive a supply of hydraulic fluid from the tank and to discharge a flow of hydraulic fluid.

The hydraulic motor includes a first motor port, a second motor port, a pressure control chamber, a swashplate, and an output shaft. The first motor port is in fluid communication with the pump to receive the flow of hydraulic fluid from the pump. The second motor port is in fluid communication with the tank to return the flow of hydraulic fluid to the tank.

The swashplate is movable over a range of travel between a forward position and a reverse position in response to a control pressure within the pressure control chamber. A zero position is disposed between the forward position and the reverse position.

The output shaft, in response to the flow of hydraulic fluid moving into the first motor port, through the hydraulic motor, and out the second motor port, rotates in a first direction at a first rate when the swashplate is in the forward position and in a second direction at a second rate when the swashplate is in the reverse position. The second direction is in opposing relationship to the first direction. The output shaft does not rotate in response to the flow of hydraulic fluid moving into the first motor port, through the hydraulic motor, and out the second motor port when the swashplate is in the zero position. The fan is rotatably coupled to the output shaft of the hydraulic motor.

The control valve is interposed between the pump and the pressure control chamber. The control valve is adapted to selectively direct the flow of hydraulic fluid from the pump through the control valve into the pressure control chamber such that the control pressure in the pressure control chamber is pressurized to an idle pressure to move the swashplate to an intermediate position between the forward position and the reverse position. The intermediate position is closer to the zero position than to the forward position and the reverse position.

The output shaft rotates at an idle rate when the swashplate is in the intermediate position in response to the flow of hydraulic fluid moving into the first motor port, through the hydraulic motor, and out the second motor port. The idle rate is less than the first rate.

In addition, the present disclosure, in another aspect, is directed to embodiments of method of controlling a fan. In an embodiment, a method of controlling a fan includes directing a flow of hydraulic fluid into a first motor port of a hydraulic motor through the hydraulic motor and out a second motor port of the hydraulic motor. The hydraulic motor includes a pressure control chamber, a servo piston, a swashplate, and an output shaft.

The servo piston is movable in response to a control pressure within the pressure control chamber. The servo piston is coupled to the swashplate such that the swashplate is movable in response to movement of the servo piston over a range of travel between a forward position and a reverse position with a zero position being disposed between the forward position and the reverse position.

The output shaft is rotatable in a first direction at a first rate when the swashplate is in the forward position and in a second direction at a second rate when the swashplate is in the reverse position, in response to the flow of hydraulic fluid moving into the first motor port, through the hydraulic motor, and out the second motor port. The second direction is in opposing relationship to the first direction. The output shaft does not rotate in response to the flow of hydraulic fluid moving into the first motor port, through the hydraulic motor, and out the second motor port when the swashplate is in the zero position.

An idle signal is transmitted from a controller to an electro-magnetic actuator assembly of an electro-hydraulic control valve to move a spool of the electro-hydraulic control valve into an intermediate pump flow position. The flow of hydraulic fluid is directed through the electro-hydraulic control valve into the pressure control chamber such that the control pressure is pressurized to an idle pressure. The idle pressure is exerted against the servo piston to move the swashplate to an intermediate position. The intermediate position is closer to the zero position than to the forward position and the reverse position such that the output shaft rotates at an idle rate when the swashplate is in the intermediate position in response to the flow of hydraulic fluid moving into the first motor port, through the hydraulic motor, and out the second motor port. The idle rate is less than half of the first rate.

Furthermore, the present disclosure, in yet another aspect, is directed to embodiments of an electro-hydraulic valve for a fan control system. In an embodiment, an electro-hydraulic valve for a fan control system includes an adaptor, a spool, and a spring.

The adaptor defines a control port, a pump port, a tank port, and a longitudinal passage. The control port, the pump port, and the tank port each are in communication with the longitudinal passage.

The spool is disposed within the longitudinal passage of the adaptor and is reciprocally movable over a range of travel between a tank flow position and a pump flow position. When the spool is in the tank flow position, the tank port and the control port are in fluid communication with each other, and the pump port is fluidly isolated from both the tank port and the control port. When the spool is in the pump flow position, the pump port and the control port are in fluid communication with each other, and the tank port is fluidly isolated from both the pump port and the control port. The spring is interposed between the adaptor and the spool to bias the spool to the tank flow position.

The spool includes an external spool surface having a circumferential groove. The circumferential groove is in communication with the control port. The circumferential groove is configured to be in communication with the tank port when the spool is in the tank flow position to fluidly connect the control port and the tank port and to be in communication with the pump port when the spool is in the pump flow position to fluidly connect the control port and the pump port. The circumferential groove is configured to be in variable communication with the pump port based upon a location of the spool between the tank flow position and the pump flow position.

Further and alternative aspects and features of the disclosed principles will be appreciated from the following detailed description and the accompanying drawings. As will be appreciated, the principles related to fan control systems, methods of controlling a fan, and electro-hydraulic valves disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 5 is an elevational view of a spool of the electro-hydraulic valve of FIG. 3.

FIG. 6 is a cross-sectional view of the spool of FIG. 5 taken along line VI-VI in FIG. 5.

Figure 1:
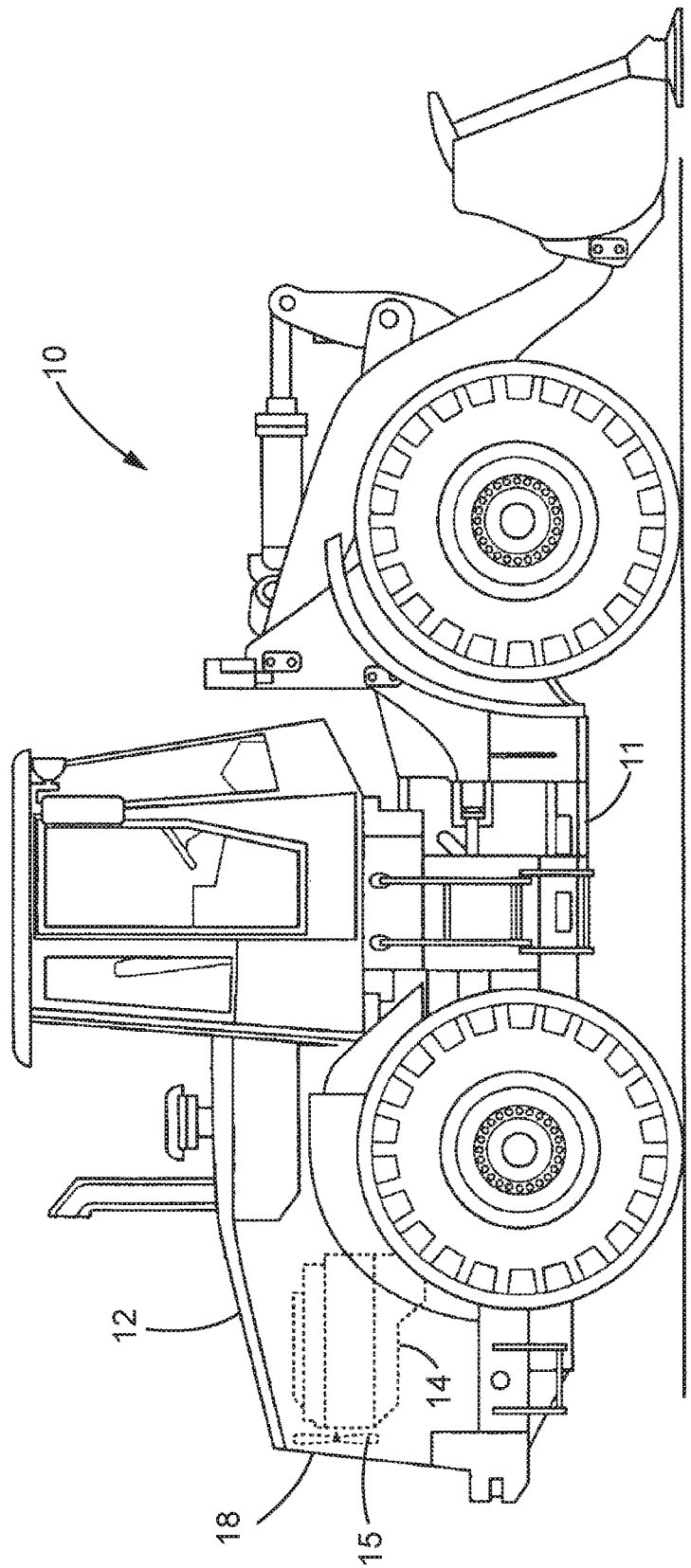
FIG. 1 is a diagrammatic side elevational view of an embodiment of a machine which can include an embodiment of a fan control system constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

There is a continued need in the art to provide additional solutions for a reversible fan control system. For example, there is a continued need for a reversible fan control system which is compact and economical while providing a range of functionality such as providing a zero speed (or near zero speed) fan operational position. In certain instances, such as, when the ambient air is below a predetermined temperature, the cooling air from the fan can cause these components to become even colder, which may be undesirable. Accordingly, in some applications, it would be advantageous for the fan to be able to be placed in a stopped (or near stopped position) such that cooling air is not directed over the engine components (or directed at a decreased flow rate).

The present disclosure provides a fan control system for a machine and a control valve providing three fan motor operational modes: forward, reverse, and idle. The motor can operate to rotate the fan in a first direction when in the forward mode, and in a second direction which is in opposing relationship to the first direction when in the reverse mode. The motor rotates the fan at a reduced or near zero speed when in the idle mode. Examples of suitable machines in which the fan control system can be used include machines used for construction, mining, forestry, and other similar industries. In some embodiments, the machine can be a mobile machine comprising a tractor, dozer, loader, excavator, or any other on-highway or off-highway vehicle, for example. In other embodiments, the machine can comprise a stationary system.

In some embodiments, a fan control system constructed according to principles of the present disclosure can include an embodiment of a control valve constructed according to principles of the present disclosure. In some embodiments, the fan control system includes a control valve that is adapted to be mounted within a constrained area and to be adapted to selectively control a hydraulic motor to provide three distinct fan operating modes: a normal forward mode, a reverse mode, and an idle mode in which the fan has a rotational speed that is at or near zero. In some embodiments, the control valve is adapted to provide consistent performance even when using a higher contaminant hydraulic fluid. In some embodiments, the control valve has a control pressure resolution that enables the control valve to operate at a lower end with sufficient reliability to allow a controller to transmit a lower-level idle signal to the control valve to place the hydraulic motor in the idle mode of operation and a higher-level reverse signal to provide the higher end pressure needed to place the hydraulic motor in the reverse mode of operation.

Turning now to the Figures, there is shown, in FIG. 1, an exemplary embodiment of a machine 10. The machine 10 may also be referenced herein as a wheel loader. In other embodiments, the machine 10 may be any suitable machine, such as, a machine with a track-type undercarriage, a dozer, loader, excavator, or any other on-highway or off-highway vehicle, for example.

The machine 10 includes a chassis 11 supporting an engine compartment 12, an engine 14, and a fan 15. The engine 14 and the fan 15, which is associated with the engine 14, can be mounted within the engine compartment 12 in a conventional manner. The engine compartment 12 defines an opening 18, which may be screened, through which the fan 15 can draw ambient air into the engine compartment 12 and circulate the ambient air over the engine 14 to cool it during operation. In some embodiments, the fan 15 can be configured to also circulate air through one or more heat exchangers, such as a radiator, an oil cooler, etc., for example.

Although the machine 10 of FIG. 1 is illustrated as an articulated wheel loader, principles of the present disclosure are equally applicable to a wide variety of machines that include cooling fans, including those that use wheels or tracks as part of the propulsion system. Furthermore, although the illustrated machine 10 of FIG. 1 is a mobile machine, in some embodiments, the machine can comprise a stationary system, such as a generator system, for example. In addition, although the present disclosure is illustrated in the context of a cooling fan for one or more of a variety of coolants and/or cooling components (e.g., hydraulic oil, transmission oil, intake air, radiator, etc.) associated with an engine and other machine systems, principles of the present disclosure can be embodied in other applications where a control valve is used to selectively rotate an output shaft of a hydraulic motor over a range of three different operating modes: forward, reverse, and idle.

Figure 2:
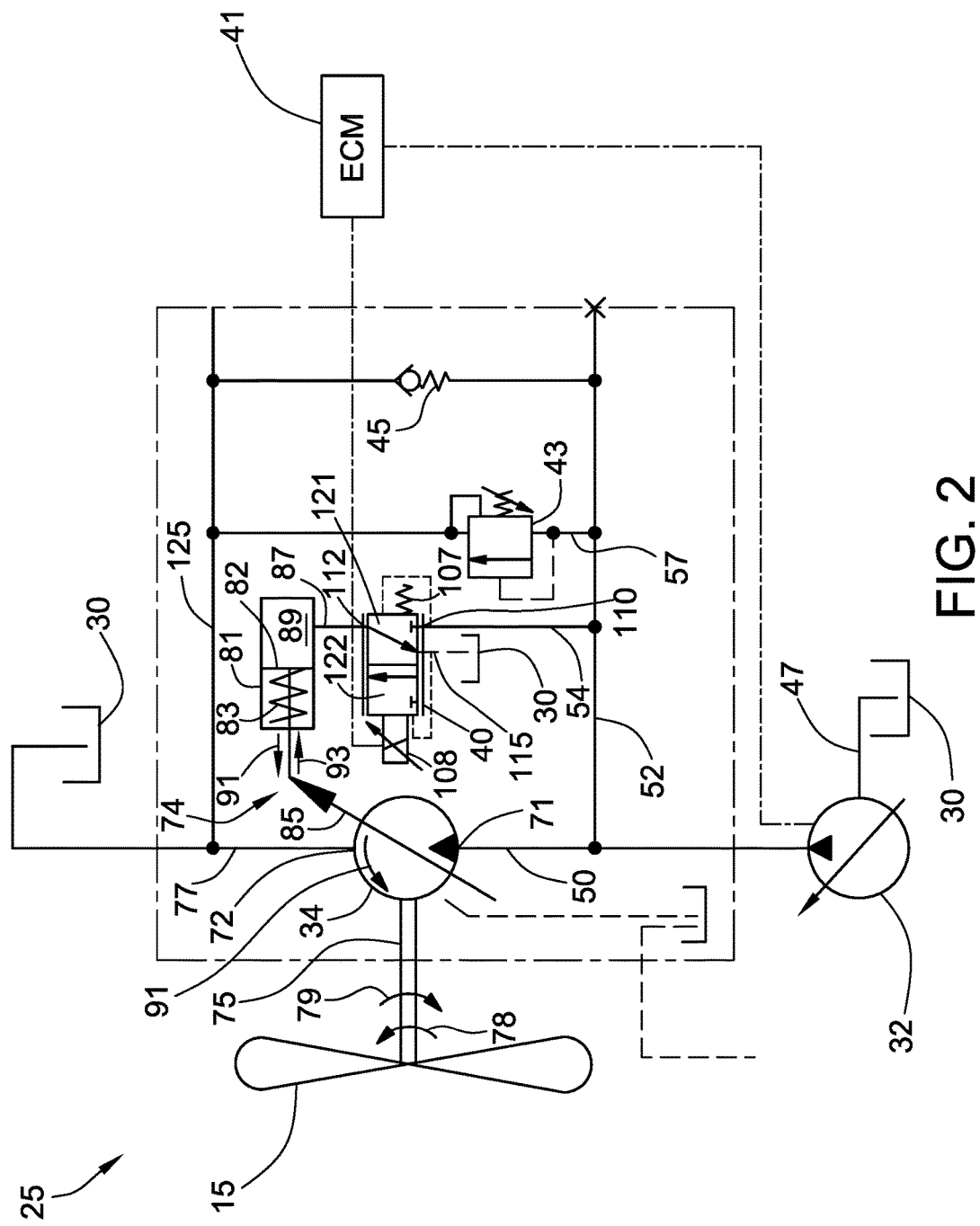
FIG. 2 is a schematic view of an embodiment of a fan control system constructed in accordance with principles of the present disclosure which is suitable for use in the machine of FIG. 1.

Referring to FIG. 2, an embodiment of a fan control system 25 constructed according to principles of the present disclosure is shown which is suitable for use in the machine 10 of FIG. 1. The illustrated fan control system 25 includes a tank 30, a pump 32, a hydraulic motor 34, the fan 15, a control valve 40, a controller 41, a pressure relief valve 43, and an anti-cavitation check valve 45.

The tank 30 is adapted to hold a reservoir of hydraulic fluid. In some embodiments, the tank 30 can be any suitable tank known to those skilled in the art. In some embodiments, the tank 30 comprises a reservoir adapted to hold a supply of hydraulic fluid which can be drawn into the pump 32 via a pump supply line 47 in order to generate a flow of hydraulic fluid for the fan control system 25.

The pump 32 is adapted to receive a supply of hydraulic fluid from the tank 30 and to discharge a flow of hydraulic fluid. In some embodiments, the pump 32 can be any suitable pump that is acceptable for the intended application, as will be readily understood by one skilled in the art. For example, in some embodiments, the pump 32 can be a suitable variable-displacement pump, as shown in FIG. 2. In some embodiments, the pump 32 can be configured to be a pressure-controlled pump.

The pump 32 is in fluid communication with the tank 30 via the pump supply line 47. The pump 32 is in fluid communication with the hydraulic motor 34 via a motor supply line 50 to selectively deliver a flow of hydraulic fluid to the hydraulic motor 34 over a range of operational modes of the hydraulic motor 34. The pump 32 is in fluid communication with the control valve 40 via a first parallel line 52 and a control valve supply line 54 to selectively deliver a control flow of hydraulic fluid through the control valve 40 and to the hydraulic motor 34 to selectively change its operational mode. The pump 32 is in fluid communication with the pressure relief valve 43 via the first parallel line 52 and a pressure relief line 57.

In some embodiments, the pump 32 is in fluid communication with the tank 30 via the pump supply line 47 to receive a feed supply of hydraulic fluid from the tank 30, which in turn can be used by the pump 32 to deliver a flow of hydraulic fluid to the hydraulic motor 34 and a control flow of hydraulic fluid to the control valve 40. In some embodiments, in the event that the pump 32 delivers a pressurized flow of hydraulic fluid that exceeds a predetermined threshold, that pressurized flow of hydraulic fluid can be diverted through the pressure relief line 57 to bypass the hydraulic motor 34 and the control valve 40 via the pressure relief valve 43.

In some embodiments, the hydraulic motor 34 can be any suitable reversible motor, such as an axial piston motor incorporating an integral servo piston. In some embodiments, the hydraulic motor 34 includes a plurality of rotating groups (displacements), such as five groups, which can be disposed in one or more housings (e.g., two housings). In some embodiments, the hydraulic motor 34 can include suitable mounting structure (e.g., cartridge mounting flanges) to enhance the installation of the fan control system 25. In some embodiments, the hydraulic motor 34 is adapted to include the ability to shift over center so that the hydraulic motor 34 combines reversing functionality without the need for additional, external valves to achieve the reversing mode.

In some embodiments, the hydraulic motor 34 includes an integral servo piston that is adapted to control motor displacement. In some embodiments, the hydraulic motor 34 is spring biased to a maximum forward displacement position and is hydraulically shifted to maximum reverse displacement position.

In the illustrated embodiment, the hydraulic motor 34 includes a first motor port 71, a second motor port 72, a drive assembly 74, and an output shaft 75. The first motor port 71 is in fluid communication with the pump 32 via the motor supply line 50 to receive the flow of hydraulic fluid therefrom. The second motor port 72 is in fluid communication with the tank 30 via a motor return line 77 to return the flow of hydraulic fluid to the tank 30. In some embodiments, the drive assembly 74 is operably arranged with the output shaft 75 and is adapted to selectively rotate the output shaft 75 in a first direction 78 or a second direction 79 (for example, in opposing relationship to the first direction 78) in response to the flow of hydraulic fluid into the first motor port 71 through the hydraulic motor 34 and out the second motor port 72. The fan 15 is rotatably coupled to the output shaft 75 of the hydraulic motor 34 such that the fan 15 rotates in the direction (and rate) of rotation of the output shaft 75.

In the illustrated embodiment, the drive assembly 74 includes a pressure control chamber 81, a servo piston 82, a bias member 83, and a swashplate 85. The pressure control chamber 81 is in fluid communication with the control valve 40 via a control valve-chamber communication passage 87. In some embodiments, at least a portion of the servo piston 82 is disposed within the pressure control chamber 81. In some embodiments, the servo piston 82 is movable in response to a control pressure developed within a piston head side 89 of the pressure control chamber 81. The servo piston 82 is coupled to the swashplate 85 such that, in response to movement of the servo piston 82, the swashplate 85 is movable over a range of travel between a forward position (as shown in FIG. 2) and a reverse position.

In some embodiments, when the swashplate 85 is in the forward position, the hydraulic motor 34 operates at maximum displacement to rotate the output shaft 75 in the first direction 78, and when the swashplate 85 is in the reverse position, the hydraulic motor 34 operates at maximum displacement to rotate the output shaft 75 in the second direction 79. In the illustrated embodiment, the swashplate is pivotally movable from the forward position in a swashplate reversing direction 91 to the reverse position such that the swashplate 85 moves through a zero position, which is disposed between the forward position and the reverse position. The output shaft 75, in response to the flow of hydraulic fluid moving from the first motor port 71 through the hydraulic motor 34 out the second motor port 72, is rotatable in the first direction 78 at a first rate when the swashplate 85 is in the forward position. The output shaft 75, in response to the flow of hydraulic fluid moving from the first motor port 71 through the hydraulic motor 34 out the second motor port 72, is rotatable in the second direction 79 at a second rate when the swashplate 85 is in the reverse position. In some embodiments, the second direction 79 can be different from the first direction 78. For example, the second direction 79 can be in opposing relationship to the first direction 78 (or in another relationship to the first direction 78). In some embodiments, the second rate can be different from the first rate. When the swashplate 85 is in the zero position, the hydraulic motor 34 has a displacement of zero such that the output shaft 75 does not rotate in response to the flow of hydraulic fluid moving from the first motor port 71 through the hydraulic motor 34 out the second motor port 72.

In some embodiments, the hydraulic motor 34 is spring-biased to maximum forward displacement at the forward position and hydraulically shifted to maximum reverse displacement at the reverse position. Accordingly, in the illustrated embodiment, the bias member 83 is arranged with the servo piston 82 such that the swashplate 85 is biased to the forward position.

When the control pressure within the piston head side 89 of the pressure control chamber 81 is pressurized to a reverse pressure, the reverse pressure can exert a swashplate moving force in the swashplate reversing direction 91 against the servo piston 82 sufficient to overcome the biasing force of the bias member 83 to move the swashplate 85 to the reverse position. When the control pressure within the piston head side 89 of the pressure control chamber 81 is pressurized to a zero-position pressure, that pressure can exert a swashplate moving force in the swashplate reversing direction 91 against the servo piston 82 sufficient to overcome the biasing force of the bias member 83 to move the swashplate 85 from the forward position to the zero position, which is between the forward position and the reverse position. Accordingly, in the illustrated embodiment, the zero-position pressure is less than the reverse pressure. In some embodiments, the bias member 83 can be any suitable component, such as a coil spring that has a desired spring constant to generate the biasing force to permit the control valve 40 to selectively shift the swashplate 85 from the forward position to the reverse position yet to have sufficient resolution to place the swashplate 85 in an idle position that is within a predetermined tolerance range of the zero position.

In some embodiments, the maximum speed and maximum applied pressure for each displacement can vary. In some embodiments, the displacement for both the forward position and the reverse position can be set with fixed internal stops.

The control valve 40 is interposed between, and in selective fluid communication with, the pump 32, the pressure control chamber 81, and the tank 30. The control valve 40 is adapted to selectively direct the flow of hydraulic fluid from the pump 32 through the control valve 40 into the pressure control chamber 81 and a return flow of hydraulic fluid from the pressure control chamber 81 to the tank 30 to vary the control pressure within the pressure control chamber 81 to move the swashplate 85 between the forward position and the reverse position.

In the illustrated embodiment, the control valve 40 is adapted to selectively direct the flow of hydraulic fluid from the pump 32 through the control valve 40 into the pressure control chamber 81 to increase the control pressure within the pressure control chamber 81 to move the swashplate 85 from the forward position (as shown) to the reverse position. In the illustrated embodiment, when the control pressure within the piston head side 89 of the pressure control chamber 81 is pressurized to the reverse pressure, the reverse pressure exert a swashplate moving force in the swashplate reversing direction 91 against the servo piston 82 that is sufficient to overcome the biasing force of the bias member 83 to move the swashplate 85 to the reverse position. In the illustrated embodiment, the controller 41 is adapted to selectively energize the control valve 40 to move the swashplate 85 to the reverse position.

When it is desired to have the hydraulic motor 34 operate in forward mode, the controller 41 can stop energizing the control valve 40 such that the bias member 83 urges the servo piston 82 in a return direction 93 such that the swashplate 85 is moved back to the forward position. In response to the movement of the servo piston 82 in the return direction 93, hydraulic fluid within the piston head side 89 of the pressure control chamber 81 is discharged from the pressure control chamber 81 through the control valve 40 to the tank 30.

In some embodiments, the control valve 40 comprises a proportional pressure control valve that is adapted to selectively direct a sufficient amount of hydraulic fluid from the pump 32 through the control valve 40 into the pressure control chamber such that the control pressure in the pressure control chamber is pressurized to an idle pressure exerted against the servo piston 82 to move the swashplate 85 to an intermediate position between the forward position and the reverse position. In some embodiments, the intermediate position is closer to the zero position than to both the forward position and the reverse position such that the output shaft 75 rotates at an idle rate when the swashplate 85 is in the intermediate position in response to the flow of hydraulic fluid moving from the first motor port 71 through the hydraulic motor 34 out the second motor port 72. In some embodiments, the magnitude of the idle rate is less than that of the rate at which the output shaft 75 rotates when the swashplate 85 is in the forward position at maximum forward displacement.

In some embodiments, the idle rate is less than half of the rate at which the output shaft 75 rotates when the swashplate 85 is in the forward position at maximum forward displacement. In some embodiments, the idle rate is no more than fifteen percent of the rate at which the output shaft 75 rotates when the swashplate 85 is in the forward position at maximum forward displacement, and no more than ten percent thereof in yet other embodiments. One skilled in the art will understand that in other embodiments, the idle rate can be configured to suit the intended application.

In some embodiments, the control valve 40 acts as a shifting valve. In some embodiments, the control valve comprises a proportional pressure-reducing valve that uses system pressure to pilot the servo piston 82. In some embodiments, the proportional controllability of the control valve 40 can be used to achieve smooth shifting between the forward position and the reverse position and to achieve sufficient resolution to repeatably place the swashplate 85 in the intermediate position over a range of system pressures, speeds, and temperatures.

Referring to FIG. 2, in the illustrated embodiment, the control valve 40 comprises a proportional pressure control valve that includes an adaptor 102 (see FIG. 3), a spool 104 (see FIG. 3), a spring 107, and an electro-magnetic actuator assembly 108. The adaptor 102 defines a pump port 110, a control port 112, and a tank port 115. The pump port 110 is in fluid communication with the pump 32 via the control valve supply line 54. The control port 112 is in fluid communication with the pressure control chamber 81 via the control valve-chamber communication passage 87. The tank port 115 is in fluid communication with the tank 30.

The spool 104 is disposed within the adaptor 102 and is reciprocally movable over a range of travel between at least a tank flow position 121 and a pump flow position 122. In the tank flow position 121, the tank port 115 and the control port 112 of the control valve 40 are in fluid communication with each other, and the pump port 110 is fluidly isolated from both the tank port 115 and the control port 112. In the pump flow position 122, the pump port 110 and the control port 112 of the control valve 40 are in fluid communication with each other, and the tank port 115 is fluidly isolated from both the pump port 110 and the control port 112. In the illustrated embodiment, the spring 107 is arranged with the spool 104 to bias the spool 104 to the tank flow position 121.

The electro-magnetic actuator assembly 108 is in electrical communication with the controller 41. The control valve 40 is adapted such that the spool 104 moves in response to a control signal received from the controller 41.

The illustrated control valve 40 comprises a proportional pressure valve in that the spool 104 moves from the tank flow position 121 toward the pump flow position 122 in an amount proportional to the electrical current transmitted from the controller 41 to the electro-magnetic actuator assembly 108. In the illustrated embodiment, the electro-magnetic actuator assembly 108 is adapted to selectively maintain the position of the spool 104 in an intermediate pump flow position. When the spool 104 is in the intermediate pump flow position, the flow of hydraulic fluid from the pump 32 through the control valve 40 to the pressure control chamber 81 is sufficient to pressurize the pressure control chamber 81 to the idle pressure which will, in turn, place the swashplate 85 in the desired intermediate position.

In some embodiments, the controller 41 can be any suitable device that is adapted to be in electrical communication with at least one of the control valve 40 or the pump 32 to selectively operate them. In some embodiments, a suitable commercially-available controller can be used.

In the illustrated embodiment, the controller 41 is adapted to selectively transmit a reverse signal and an idle signal to the electro-magnetic actuator assembly 108. The reverse signal is adapted to maintain the position of the spool 104 in the pump flow position 122 such that the control pressure in the pressure control chamber 81 is pressurized to a reverse pressure exerted against the servo piston 82 to place the swashplate 85 in the reverse position. The idle signal is adapted to maintain the position of the spool 104 in the intermediate pump flow position to place the swashplate 85 in the desired intermediate position.

In the illustrated embodiment, the reverse pressure is greater than the idle pressure. In the illustrated embodiment, the current of the command signal generated by the controller 41 is proportional to the pressure generated within the pressure control chamber 81. Accordingly, the idle signal has a current which is less than the current of the reverse signal, and the reverse signal and the idle signal are proportional to the idle pressure and the reverse pressure. In some embodiments, the controller 41 and the control valve 40 can be configured such that the idle signal can reproducibly produce an idle pressure within the pressure control chamber that is within a predetermined tolerance of a target idle pressure (e.g. within plus/minus one-half Bar of a target idle pressure).

In some embodiments, the control valve 40 operates by means of a pressure differential between the supply of the pump 32 and the tank 30. When the electro-magnetic actuator assembly 108 receives a certain command current from the controller 41, this causes the pump port 110 to open and equal out the pressure differential created. In some embodiments, the control valve 40 can work as a load sense in that very little flow travels through the control valve 40, that is, enough hydraulic fluid flow to achieve an equilibrium of forces driven by the commanded current.

In other embodiments, the control valve 40 can have a construction different from a proportional valve. For example, in some embodiments, the control valve 40 can include two coil assemblies. The first coil assembly can be configured to receive a command signal from the controller 41 to place the spool 104 in the pump flow position 122 for the reverse position, and the second coil assembly can be configured to receive the command signal from the controller 41 to place the spool 104 in the intermediate pump flow position for the intermediate position.

In some embodiments, the controller 41 is in electrical communication with the pump 32. In some embodiments, the controller 41 can be configured to transmit a command signal to the pump 32 to operate the pump over a range of different operating pressures from a minimum pump pressure (or standby pressure) to a maximum pump pressure. It should be understood that the minimum and maximum pump pressures can be a selected low and high operating pressure value, respectively, rather than the actual minimum and maximum possible pressures generated by the pump 32.

In some embodiments, the command signal is inversely proportional to the pressure generated by the pump such that the greater the current of the command signal the lower the pump pressure. In other embodiments, a different relationship between the command signal and the pressure generated by the pump can be used.

In some embodiments, the controller 41 can be configured to operate the pump 32 at the selected maximum pump pressure when the hydraulic motor 34 is operating in either the forward or the reverse mode. In other embodiments, a different relationship between the operating pressure of the pump 32 and the forward and/or the reverse mode can be used.

In some embodiments, when the controller 41 places the hydraulic motor 34 in the idle mode, the controller 41 can be configured to also send a command signal to the pump 32 to reduce the operating pressure to the selected standby pump pressure (e.g., at a minimum pump pressure of a selected pressure operating range). In some embodiments, the standby pump pressure is greater than ambient pressure (such as, a standby pressure of about 20 Bar, e.g.). In some embodiments, when the controller 41 has sent the idle signal to the electro-magnetic actuator assembly 108 to place the swashplate 85 in the desired intermediate position and has sent the command signal to the pump 32 to reduce its operating pressure to the standby pump pressure, the flow of hydraulic fluid from the pump 32 to the first motor port 71 can be significantly restricted relative to what it is when the pump is operating at the maximum pump pressure. In some embodiments, the flow of hydraulic fluid from the pump 32 to the first motor port 71 is substantially stopped when the hydraulic motor 34 is in the idle mode and the pump is operating at the standby pump pressure.

The pressure relief valve 43 is connected in parallel fluid relationship with the hydraulic motor 34 via the first parallel line 52 and a second parallel line 125. The pressure relief valve 43 is in fluid communication with the pump 32 and the tank 30. The pressure relief valve 43 is adapted such that a pressurized flow of hydraulic fluid from the pump 32 that exceeds a predetermined pressure threshold (e.g., 280 bars or 345 bars) is diverted away from the hydraulic motor 34 through the pressure relief valve 43 and to the tank 30. In some embodiments, the pressure relief valve 43 is adapted to be used for system over-pressure protection events of a limited duration.

The anti-cavitation check valve 45 connected in parallel fluid relationship with the hydraulic motor 34 via the first parallel line 52 and the second parallel line 125. The anti-cavitation check valve 45 is arranged such that a motor return flow of hydraulic fluid from the second motor port 72 is permitted to pass through the anti-cavitation check valve 45 to the first motor port 71. In some embodiments, the anti-cavitation check valve 45 can help provide protection against cavitation which can occur with an overrunning load or from the loss of input flow. In such cases where the system delta pressure becomes negative, the anti-cavitation check valve 45 can be adapted to open to fluidly connect the motor outlet 72 to the motor inlet 71, thereby effectively short-circuiting the hydraulic motor 34 to help prevent cavitation.

In other embodiments, a reversible fan control system constructed according to principles of the present disclosure can include other components and have different arrangements. In addition, it should be recognized that the terms such as "forward" and "reverse" in reference to the direction of rotation of the fan 15 in the exemplary embodiments described herein are used merely as convenient labels to facilitate the understanding of one skilled in the art and are not meant to be limiting in any way. Other terms, such as, "first" and "second," could be interchangeably used as well, and the selection of one such identifying label over another should not be construed to be limiting in any way.

Figure 3:
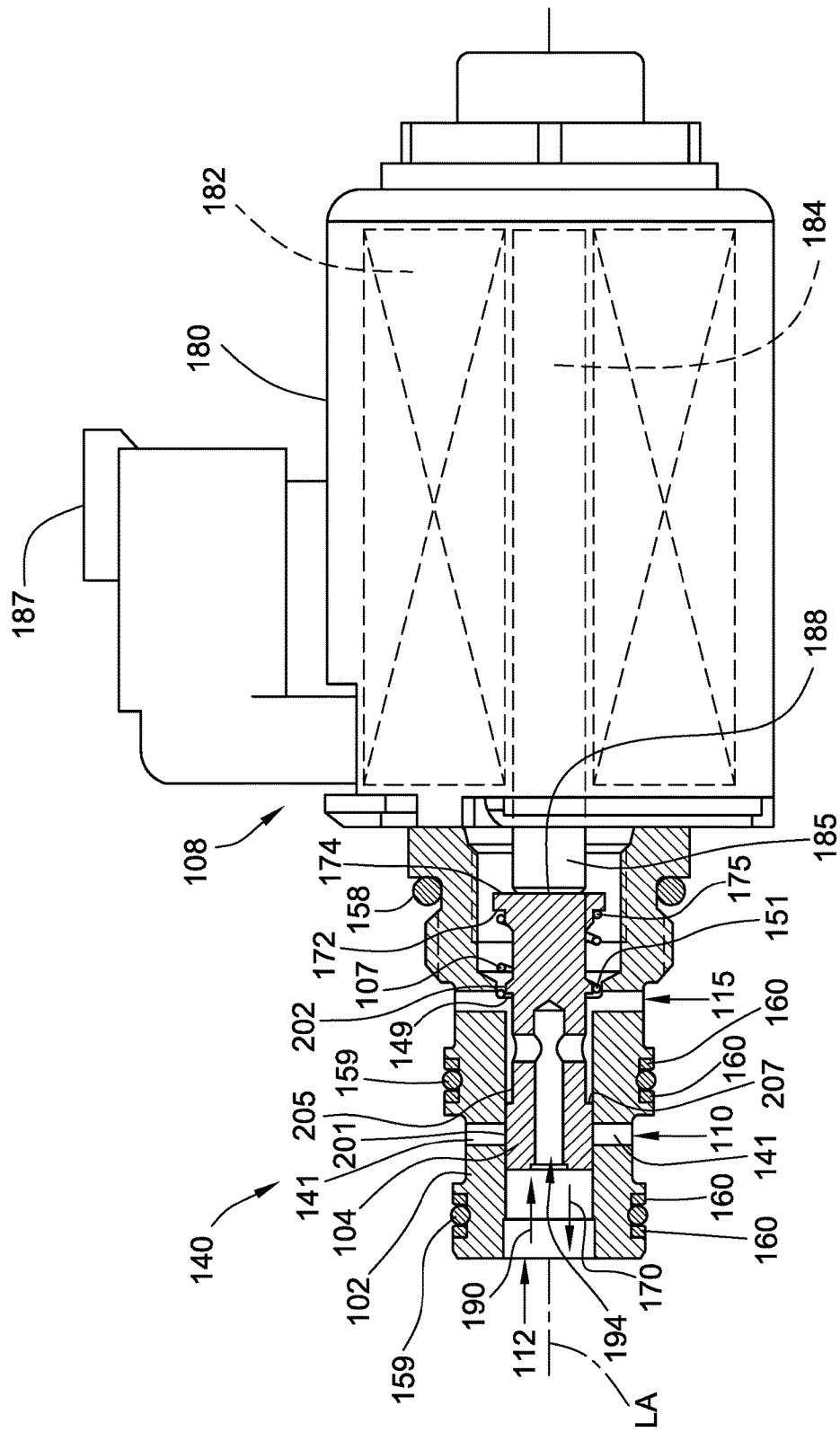
FIG. 3 is an elevational view, in partial section, of an embodiment of an electro-hydraulic valve constructed in accordance with principles of the present disclosure

Referring to FIG. 3, an embodiment of an electro-hydraulic valve 140 for a fan control system constructed according to principles of the present disclosure is shown. The electro-hydraulic valve 140 is an example of a control valve suitable for use in the fan control system 25 of FIG. 2. The illustrated electro-hydraulic valve 140 includes an adaptor 102, a spool 104, a spring 107, and an electro-magnetic actuator assembly 108 in the form of a solenoid assembly.

Figure 4:
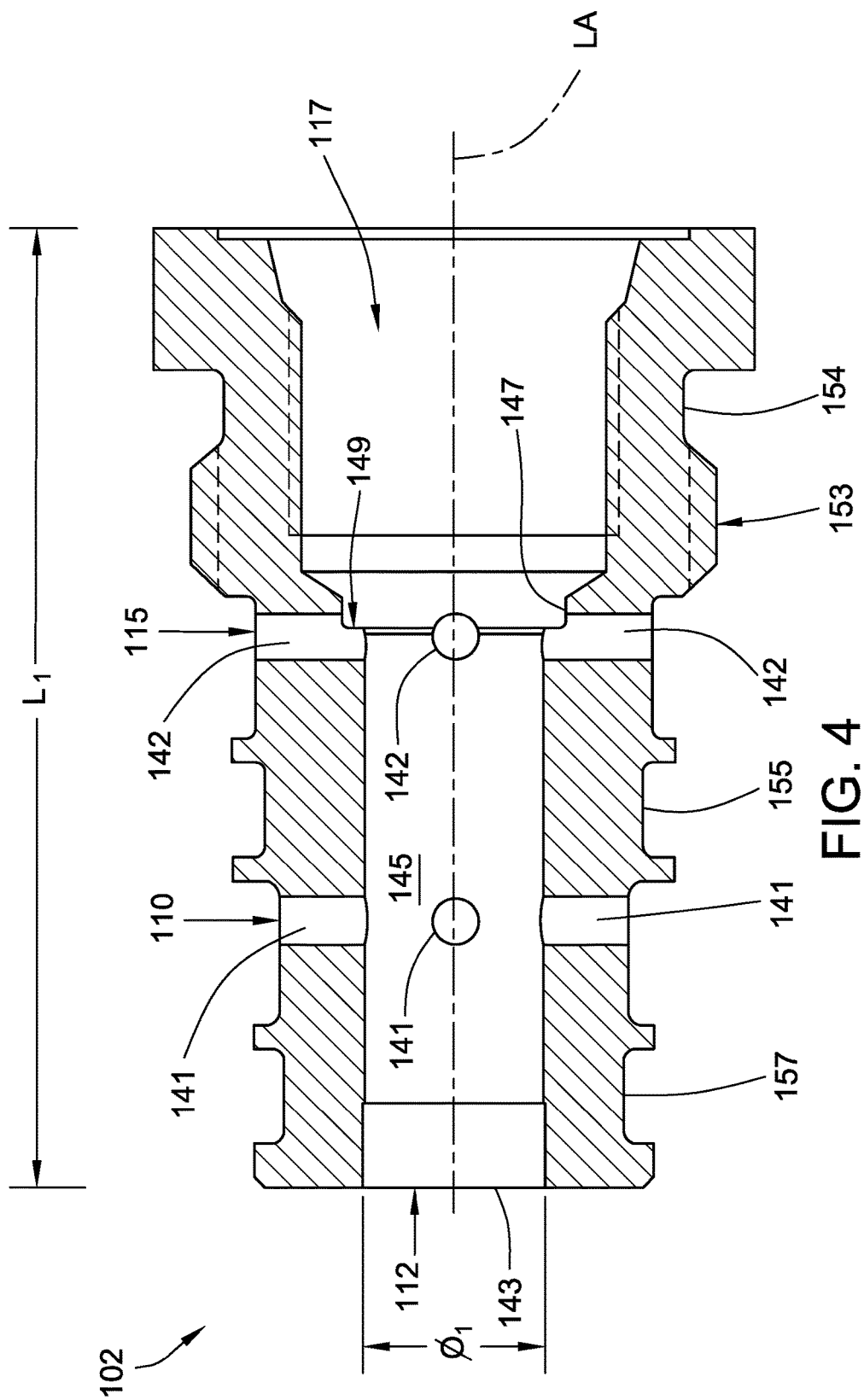
FIG. 4 is a longitudinal cross-sectional view of an adaptor of the electro-hydraulic valve of FIG. 3.

Referring to FIG. 4, the adaptor 102 defines a pump port 110, a control port 112, a tank port 115, and a longitudinal passage 117. The control port 112, the pump port 110, and the tank port 115 are each in communication with the longitudinal passage 117.

In some embodiments, the pump port 110 includes a plurality of pump port cross bores 141 which are in communication with the longitudinal passage 117. The longitudinal passage extends along a longitudinal axis LA of the adaptor 102. In the illustrated embodiment, the pump port 110 includes four pump port cross bores 141 (three of which are shown) that are in substantially uniform circumferential spaced relationship to each other about the adaptor 102. In some embodiments, the tank port 115 includes a plurality of tank port cross bores 142 which are in communication with the longitudinal passage 117. In the illustrated embodiment, the tank port 115 also includes four tank port cross bores 142 (three of which are shown) that are in substantially uniform circumferential spaced relationship to each other about the adaptor 102. In the illustrated embodiment, the pump port cross bores 141 are in respective circumferential alignment with the tank port cross bores 142. In other embodiments, the pump port cross bores 141 and the tank port cross bores 142 can have a different alignment relationship with respect to each other.

In the illustrated embodiment, the control port 112 comprises a distal opening 143 of the longitudinal passage 117. The control port 112 of the adaptor 102 is circular and has a control port diameter $\emptyset_1$. In some embodiments, the control port diameter $\emptyset_1$ can be adjusted to help balance the opposing forces developed within the electro-hydraulic valve 140 during its operation.

The adaptor 102 includes an internal adaptor surface 145 that defines the longitudinal passage 117. In some embodiments, the internal adaptor surface 145 has a stepped configuration that helps define stop surfaces for providing a positive engagement between the adaptor 102 and other components of the electro-hydraulic valve 140. For example, the internal adaptor surface 145 includes a shoulder 147 defined by a spring base surface 149. The spring base surface 149 extends radially and is longitudinally aligned with the tank port cross bores 142 of the tank port 115. The spring base surface 149 is configured to be in engaging relationship with a distal end 151 of the spring 107 (see FIG. 3).

Referring to FIG. 2, in some embodiments, the electro-hydraulic valve 140 can be configured to fit within a constricted hydraulic portion within a housing of the hydraulic motor 34 such that the electro-hydraulic valve 140 is mounted within the motor housing. In some embodiments, the adaptor 102 has an adaptor length $L_1$ that is shortened such that it is configured to fit within a predetermined space within the housing of the hydraulic motor 34. In other embodiments, the electro-hydraulic valve 140 can be mounted in a housing separate from the hydraulic motor 34 (e.g., a separate manifold).

The adaptor 102 includes an outer adaptor surface 153 that defines a series of outer circumferential grooves 154, 155, 157. The outer circumferential grooves 154, 155, 157 are respectively configured to accept a seal member 158, 159 therein to help fluidly isolate the pump port 110, the control port 112, and the tank port 115 other than through selective fluid flow through the interior of the adaptor 102 (see FIG. 3). The seal members 158, 159 can be in circumscribing relationship with the adaptor 102. In some embodiments, any suitable seal member (such as a commercially-available o-ring, for example) can be used. In some embodiments, at least one of the seal members 159 can be interposed between a pair of back up rings 160 to help resist relatively high supply pressure from the pump 32 and to help reduce leakage.

Referring to FIG. 3, the spool 104 is disposed within the longitudinal passage of the adaptor 102 and is reciprocally movable along the longitudinal axis LA over a range of travel between a tank flow position (as shown in FIG. 3) in which the tank port 115 and the control port 112 of the control valve are in fluid communication with each other and the pump port 110 is fluidly isolated from both the tank port 115 and the control port 112 and a pump flow position in which the pump port 110 and the control port 112 of the control valve are in fluid communication with each other and the tank port 115 is fluidly isolated from both the pump port 110 and the control port 112. In the illustrated embodiment, the spool 104 can move from the position shown in FIG. 3 along the longitudinal axis LA in a supply shifting direction 170 to move from the tank flow position to the pump flow position.

The spring 107 is interposed between the adaptor 102 and the spool 104 to bias the spool 104 to the tank flow position. The spool 104 includes a spring seat 172 defined by a proximal end 174 of the spool 104. The spring seat 172 is configured to be in engaging relationship with a proximal end 175 of the spring 107.

The solenoid assembly 108 is adapted to selectively move the spool 104 from the tank flow position to the pump flow position. In some embodiments, the solenoid assembly 108 can be any suitable solenoid assembly having any suitable configuration known to those skilled in the art. In some embodiments, the solenoid assembly 108 can include a housing 180, a coil 182 disposed within the housing 180, and an armature assembly 184 disposed within the coil 182 and having at least an armature 185. In some embodiments, the armature assembly 184 can include other components known to those skilled in the art, such as a spring and a pole piece, for example. The solenoid assembly 108 can include an electrical connector port 187 that is configured to place the coil 182 of the solenoid assembly 108 in electrical communication with the controller 41. In some embodiments, the solenoid assembly 108 and the adaptor 102 can be arranged together via any suitable technique known to those skilled in the art such that they are coupled together.

The armature 185 is movable in response to an electrical current transmitted through the coil 182. In the illustrated embodiment, the armature 185 is arranged with the spool 104 such that the armature 185 moves the spool 104 from the tank flow position in the supply shifting direction 170 toward the pump flow position in an amount proportional to the electrical current transmitted through the coil 182. In the illustrated embodiment, the armature 185 is axially aligned with the spool 104 such that a distal end 188 of the armature 185 is in contacting relationship with the proximal end 174 of the spool 104. Once the controller 41 ceases to send a command signal to the coil 182 of the solenoid assembly 108, the spring 107 acts to urge the spool 104 back in a tank shifting direction 190 to the tank flow position.

Referring to FIGS. 5 and 6, in some embodiments, the spool 104 includes an internal spool surface 192 that defines a longitudinal blind bore 194 and a plurality of spool cross bores 195 in communication with the longitudinal blind bore 194. In the illustrated embodiment, the spool 104 includes two spool cross bores 195 that are in opposing relationship to each other. The spool 104 includes an external spool surface 197 having a supply land 201 and a tank land 202 with a circumferential groove 205 defined therebetween. The circumferential groove 205 is in communication with the control port 112 via the spool cross bores 195 and the longitudinal blind bore 194.

Referring to FIG. 5, the spool 104 has a spool length $L_2$. In some embodiments, the spool length $L_2$ is at least fifty percent of the adaptor length $L_1$. In the illustrated embodiment, the spool length $L_2$ is about sixty percent of the adaptor length $L_1$.

The supply land 201 of the spool 104 has a supply land length $L_3$, and the circumferential groove 205 of the spool 104 has a groove length $L_4$. In some embodiments, the supply land length $L_3$ is less than the groove length $L_4$, and is in a range between fifty percent and seventy five percent in some of such embodiments. In the illustrated embodiment, the supply land length $L_3$ is about sixty percent of the groove length $L_4$.

Referring to FIG. 6, the longitudinal blind bore 194 of the spool 104 has a spool bore diameter $\varnothing_2$. In some embodiments, the diameter $\varnothing_2$ of the longitudinal blind bore 194 is less than half of the diameter $\varnothing_1$ of the control port 112 of the adaptor 102, and in a range between twenty-five percent and fifty percent in some of such embodiments. In the illustrated embodiment, the diameter $\varnothing_2$ of the longitudinal blind bore 194 is about one-third of the diameter $\varnothing_1$ of the control port 112 of the adaptor 102 (see also, FIGS. 3 and 4).

Referring to FIG. 3, the longitudinal blind bore 194 is in communication with the control port 112. The supply land 201 is configured to fluidly isolate the pump port 110 from both the control port 112 and the tank port 115 when the spool 104 is in the tank flow position. The tank land 202 is configured to fluidly isolate the tank port 115 from both the pump port 110 and the control port 112 when the spool 104 is in the pump flow position. The circumferential groove 205 is configured to be in communication with the tank port 115 when the spool 104 is in the tank flow position to fluidly connect the control port 112 and the tank port 115 and to be in communication with the pump port 110 when the spool 104 is in the pump flow position to fluidly connect the control port 112 and the pump port 110.

The circumferential groove 205 is configured to be in variable communication with the pump port 110 as a function of a location of the spool 104 between the tank flow position and the pump flow position. Once the spool 104 moves in the supply shifting direction 170 from the tank flow position to the pump flow position a sufficient distance, the tank land 202 occludes the tank port 115 and a distal edge 207 of the circumferential groove 205 moves axially within the pump port cross bores 141. In the illustrated embodiment, continued movement of the spool in the supply shifting direction 170 along the longitudinal axis LA increasingly opens the flow path between the pump port 110 and the control port 112 in a manner that is proportional to the axial movement of the spool 104.

When there is no electrical current transmitted through the coil 182, the pump port 110 is fluidly isolated (as shown in FIG. 3), and the control port 112 is in fluid communication with the tank port 115. In this tank flow position, the fan can be operated in the forward mode. When the reverse signal (with high-end current) is applied to the coil 182, the armature 185 moves the spool 104 in the supply shifting direction 170, thereby placing the pump port 110 in fluid communication with the control port 112 and fluidly isolating the tank port 115. In this pump flow position, the fan can be operated in the reverse mode. Since the valve 140 in the illustrated embodiment is proportional in design, the output for the control pressure is based upon the force of the solenoid assembly 108 (through the action of the armature 185) which is opposed by the force of the spring 107 and the area where the fluid acts upon the control port area. In some embodiments, when the idle signal is applied to the coil 182, which has a current that is less than the reverse signal, the armature 185 moves the spool 104 from the tank flow position in the supply shifting direction 170 to an intermediate pump flow position sufficient to place the pump port 110 in partial fluid communication with the control port 112 and to fluidly isolate the tank port 115 such that the control pressure in the pressure control chamber is at the idle pressure to move the swashplate to the idle position.

In some embodiments, the resolution of the electro-hydraulic valve 140 can be enhanced to improve its ability to place the hydraulic motor 34 in one of the three distinct operational modes: regular forward mode, reverse mode, and idle mode (within a near zero range). In some embodiments, the resolution of the electro-hydraulic valve 140 can be enhanced by reducing the control pressure outlet and increasing the amperage range of the coil 182 of the solenoid assembly 108. In some embodiments, the adaptor 102, the spool 104, and the spring 107 can be configured such that that a proportional force generated by the coil 182 can be controlled by the controller 41 such that the spool 104 is placed in a position that can produce the desired control pressure within the pressure control chamber 81 while maintaining repeatable accuracy through an operational life of the electro-hydraulic valve 140. Furthermore, the solenoid assembly 108 can be configured to impart sufficient movement of the spool 104 to the pump flow position to achieve a top end control pressure for the reverse pressure to reach fan reversal for a range of intended operational conditions.

The degree to which the hydraulic fluid contains contaminants may affect the ability of the electro-hydraulic valve 140 to maintain the idle mode functionality. In some embodiments, to help reduce the occurrence of contaminating hydraulic fluid negatively affecting the performance of the electro-hydraulic valve 140, the coil 182 of the solenoid assembly 108 can be a high-force coil (e.g., 60 N) that is adapted to generate an armature force that can move the spool 104 to the reverse position even under dirty hydraulic fluid conditions. In addition, in some embodiments, clearance tolerances between the spool 104 and the adaptor 102 can be configured to permit contaminants carried in the hydraulic fluid to flow through the electro-hydraulic valve 140. In some embodiments, a control valve constructed according to principles of the present disclosure can include other components and have different arrangements.

Figure 7:
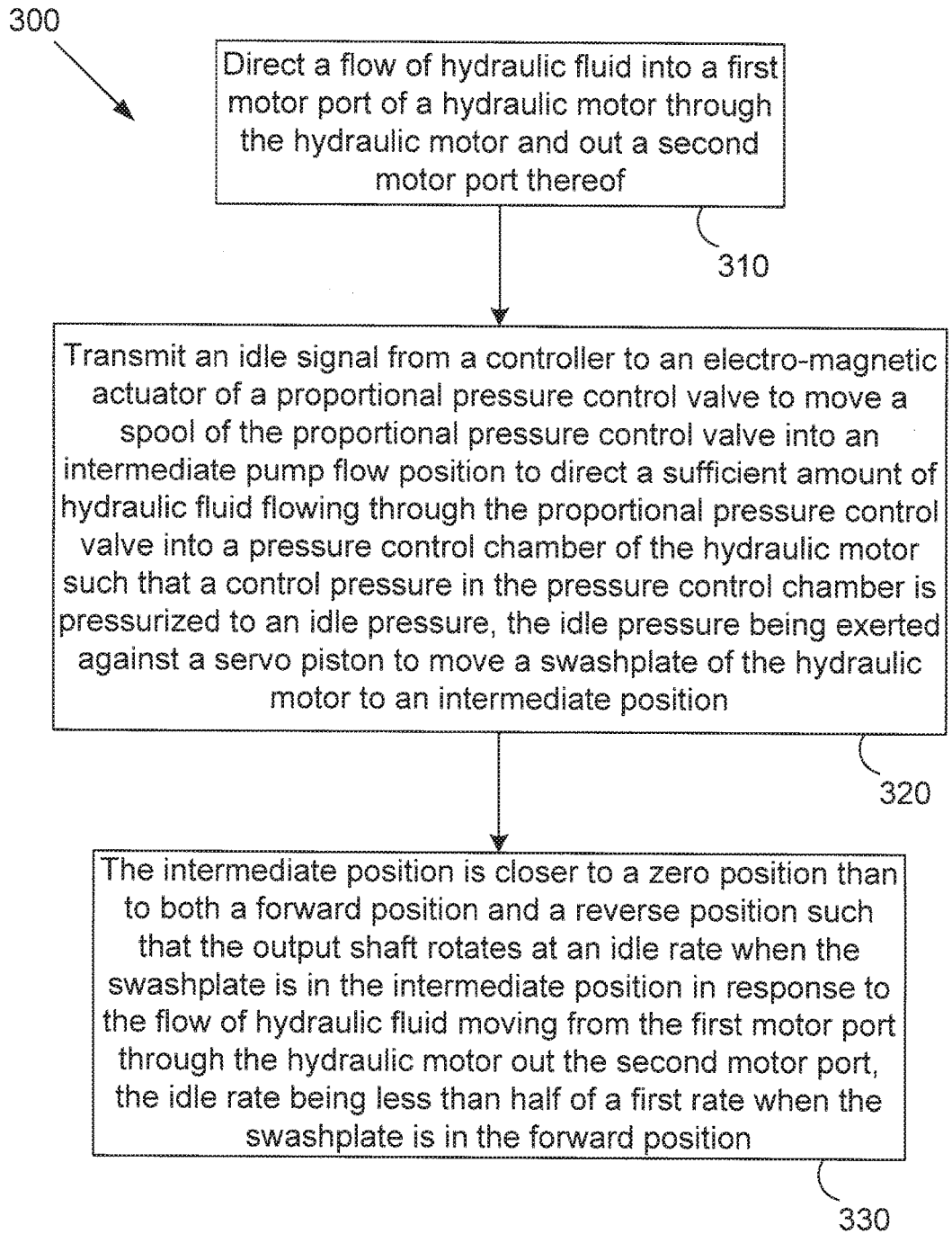
FIG. 7 is a flow chart illustrating steps of an embodiment of a method of controlling a fan following principles of the present disclosure.

Referring to FIG. 7, steps of an embodiment of a method 300 of controlling a fan component in accordance with principles of the present disclosure are shown. In the method 300, a flow of hydraulic fluid is directed into the first motor port of a hydraulic motor through the hydraulic motor and out the second motor port thereof (step 310). The hydraulic motor includes a pressure control chamber, a servo piston, a swashplate, and an output shaft. The servo piston is movable in response to a control pressure within the pressure control chamber. The servo piston is coupled to the swashplate such that the swashplate is movable in response to movement of the servo piston over a range of travel between a forward position and a reverse position with a zero position being disposed between the forward position and the reverse position. The output shaft, in response to the flow of hydraulic fluid moving from the first motor port through the hydraulic motor out the second motor port, is rotatable in a first direction at a first rate when the swashplate is in the forward position and in a second direction at a second rate when the swashplate is in the reverse position. The second direction is in opposing relationship to the first direction. The output shaft does not rotate in response to the flow of hydraulic fluid moving from the first motor port through the hydraulic motor out the second motor port when the swashplate is in the zero position.

An idle signal is transmitted from a controller to an electro-magnetic actuator assembly of an electro-hydraulic control valve to move a spool of the electro-hydraulic control valve into an intermediate pump flow position to direct a sufficient amount of hydraulic fluid flowing through the electro-hydraulic control valve into the pressure control chamber such that the control pressure is pressurized to an idle pressure (step 320). The idle pressure is exerted against the servo piston to move the swashplate to an intermediate position.

The intermediate position is closer to the zero position than to both the forward position and the reverse position such that the output shaft rotates at an idle rate when the swashplate is in the intermediate position in response to the flow of hydraulic fluid moving from the first motor port through the hydraulic motor out the second motor port. The idle rate is less than half of the first rate (330).

In some embodiments of a method of controlling a fan following principles of the present disclosure, the method further includes receiving, by the controller, an indication that an operational condition is satisfied. The idle signal can be discontinued such that a return flow of hydraulic fluid is permitted to drain from the pressure control chamber to depressurize the pressure control chamber, thereby permitting the servo piston to move the swashplate to the forward position. In some embodiments, the operational condition comprises at least one of an ambient temperature being exceeded, an engine compartment temperature being exceeded, and a running time having elapsed. For example, in some embodiments, the hydraulic motor can be placed in the idle mode when the ambient temperature is below a certain threshold temperature such that the fan is not operated in a way that cools engine components to a temperature below a desired minimum operating temperature.

In some embodiments of a method of controlling a fan following principles of the present disclosure, the method further includes transmitting a reverse signal to the electro-magnetic actuator assembly of the electro-hydraulic control valve to move the spool of the electro-hydraulic control valve into a pump flow position to direct a flow of hydraulic fluid through the electro-hydraulic control valve to the pressure control chamber such that the control pressure in the pressure control chamber is pressurized to a reverse pressure exerted against the servo piston to move the swashplate to the reverse position. In some embodiments, the reverse pressure is greater than the idle pressure. In some embodiments, the idle signal has a first current, and the reverse signal has a second current which is greater than the first current. In some embodiments, the first current and the second current are proportional to the idle pressure and the reverse pressure.

INDUSTRIAL APPLICABILITY

The industrial applicability of the embodiments of a fan control system for a machine and a control valve for a fan control system described herein will be readily appreciated from the foregoing discussion. At least one embodiment of the disclosed control valve can be used in a fan control system constructed according to principles of the present disclosure. At least one embodiment of the fan control system can be used in a machine. An exemplary embodiment of a fan control system for a machine provides three different operational positions for the fan, namely forward, reverse, and idle modes. Embodiments of a control valve and a fan control system according to principles of the present disclosure may find potential application in any machine, such as tractors, dozers, loaders, excavators, or any other on-highway or off-highway vehicles or stationary machines that utilize a fan, as described herein.

In some embodiments, a fan control system constructed according to principles of the present disclosure can be used to operate a hydraulic motor at three distinct displacement positions, i.e. positive maximum displacement, negative maximum displacement, and an idle displacement that is within a desired range of zero displacement. Embodiments of a fan control system constructed according to principles of the present disclosure can provide a relatively low cost solution for achieving three distinct motor positions using a hydraulic motor typically designed to operate at two positions, i.e. maximum positive displacement and maximum negative displacement. In some embodiments, a pressure control valve constructed according to principles of the present disclosure can be adapted to provide sufficient resolution to permit the hydraulic motor to operate at neutral (or idle) displacement and yet have adequate power to drive the spool to the reverse position to operate the hydraulic motor in the reverse position at maximum negative displacement.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A fan control system comprising:
   a tank, the tank adapted to hold a reservoir of hydraulic fluid;
   a pump,
      the pump in fluid communication with the tank, the pump adapted to receive a supply of hydraulic fluid from the tank and to discharge a flow of hydraulic fluid;
   a hydraulic motor,
      the hydraulic motor including a first motor port, a second motor port, a pressure control chamber, a swashplate, and an output shaft,
      the first motor port being in fluid communication with the pump to receive the flow of hydraulic fluid from the pump, and the second motor port being in fluid communication with the tank to return the flow of hydraulic fluid to the tank,
      the swashplate being movable over a range of travel between a forward position and a reverse position in response to a control pressure within the pressure control chamber, a zero position being disposed between the forward position and the reverse position,
      the output shaft, in response to the flow of hydraulic fluid moving into the first motor port, through the hydraulic motor, and out the second motor port, rotating in a first direction at a first rate when the swashplate is in the forward position and in a second direction at a second rate when the swashplate is in the reverse position, the second direction being in opposing relationship to the first direction, and
      the output shaft does not rotate in response to the flow of hydraulic fluid moving into the first motor port, through the hydraulic motor, and out the second motor port when the swashplate is in the zero position;
   a fan, the fan rotatably coupled to the output shaft of the hydraulic motor; and
   a control valve,
      the control valve interposed between the pump and the pressure control chamber,
      the control valve being adapted to selectively direct the flow of hydraulic fluid from the pump through the control valve into the pressure control chamber such that the control pressure in the pressure control chamber is pressurized to an idle pressure to move the swashplate to an intermediate position between the forward position and the reverse position, the intermediate position electro-magnetic actuator assembly being closer to the zero position than to the forward position and the reverse position,
      the output shaft rotating at an idle rate when the swashplate is in the intermediate position in response to the flow of hydraulic fluid moving into the first motor port, through the hydraulic motor, and out the second motor port, the idle rate being less than half of the first rate.

2. The fan control system according to claim 1, wherein the control valve comprises a proportional control valve that includes:
   an adaptor,
      the adaptor defining a pump port, a control port, and a tank port,
      the pump port being in fluid communication with the pump, the control port being in fluid communication with the pressure control chamber, and the tank port being in fluid communication with the tank,
   a spool,
      the spool disposed within the adaptor and reciprocally movable over a range of travel between at least a tank flow position and a pump flow position,
      when the spool is in the tank flow position, the tank port and the control port are in fluid communication with each other, and the pump port is fluidly isolated from both the tank port and the control port, and
      when the spool is in the pump flow position, the pump port and the control port of the control valve are in fluid communication with each other, and the tank port is fluidly isolated from both the pump port and the control port,
   a spring, the spring arranged with the spool to bias the spool to the tank flow position, and an electro-magnetic actuator assembly, the electro-magnetic actuator assembly adapted to selectively maintain the spool in an intermediate pump flow position such that the flow of hydraulic fluid, from the pump through the control valve to the pressure control chamber, is sufficient to pressurize the pressure control chamber to the idle pressure.

3. The fan control system according to claim 2, further comprising:

a pressure relief valve, the pressure relief valve connected in parallel fluid relationship with the hydraulic motor and in fluid communication with the pump and the tank, the pressure relief valve adapted such that a pressurized flow of hydraulic fluid from the pump that exceeds a predetermined pressure threshold is diverted away from the hydraulic motor, through the pressure relief valve, to the tank.

4. The fan control system according to claim 2, further comprising:

an anti-cavitation check valve, the anti-cavitation check valve connected in parallel fluid relationship with the hydraulic motor and arranged such that a motor return flow of hydraulic fluid from the second motor port is permitted to pass through the anti-cavitation check valve to the first motor port.

5. The fan control system according to claim 2, wherein the hydraulic motor includes a bias member, the bias member being arranged such that the swashplate is biased to the forward position.

6. The fan control system according to claim 5, further comprising:

a controller, the controller in electrical communication with the electro-magnetic actuator assembly of the proportional control valve, the controller adapted to selectively transmit a reverse signal and an idle signal to the electro-magnetic actuator assembly, the reverse signal adapted to maintain the spool in the pump flow position such that the control pressure in the pressure control chamber is pressurized to a reverse pressure to place the swashplate in the reverse position, and the idle signal is adapted to maintain the spool in the intermediate pump flow position to place the swashplate in the intermediate position.

7. The fan control system according to claim 6, wherein the reverse pressure is greater than the idle pressure, and the idle signal has a first current, the reverse signal having a second current, the second current being greater than the first current, and the first current and the second current being proportional to the idle pressure and the reverse pressure.

8. The fan control system according to claim 6, wherein the idle rate is no more than fifteen percent of the first rate.

9. A method of controlling a fan comprising:

directing a flow of hydraulic fluid into a first motor port of a hydraulic motor through the hydraulic motor and out a second motor port of the hydraulic motor, the hydraulic motor including a pressure control chamber, a servo piston, a swashplate, and an output shaft, the servo piston movable in response to a control pressure within the pressure control chamber, the servo piston coupled to the swashplate such that the swashplate is movable in response to movement of the servo piston over a range of travel between a forward position and a reverse position with a zero position being disposed between the forward position and the reverse position, and the output shaft being rotatable in a first direction at a first rate when the swashplate is in the forward position and in a second direction at a second rate when the swashplate is in the reverse position, in response to the flow of hydraulic fluid moving into the first motor port, through the hydraulic motor, and out the second motor port, the second direction being in opposing relationship to the first direction, and wherein the output shaft does not rotate in response to the flow of hydraulic fluid moving into the first motor port, through the hydraulic motor, and out the second motor port when the swashplate is in the zero position;

transmitting an idle signal from a controller to an electro-magnetic actuator assembly of an electro-hydraulic control valve to move a spool of the electro-hydraulic control valve into an intermediate pump flow position, the flow of hydraulic fluid being directed through the electro-hydraulic control valve into the pressure control chamber such that the control pressure is pressurized to an idle pressure, the idle pressure being exerted against the servo piston to move the swashplate to an intermediate position;

wherein the intermediate position is closer to the zero position than to the forward position and the reverse position, the output shaft rotating at an idle rate when the swashplate is in the intermediate position in response to the flow of hydraulic fluid moving into the first motor port, through the hydraulic motor, and out the second motor port, and the idle rate being less than half of the first rate;

transmitting a reverse signal to the electro-magnetic actuator assembly of the electro-hydraulic control valve to move the spool of the electro-hydraulic control valve into a pump flow position, the flow of hydraulic fluid being directed through the electro-hydraulic control valve to the pressure control chamber such that the control pressure in the pressure control chamber is pressurized to a reverse pressure exerted against the servo piston to move the swashplate to the reverse position, the reverse pressure being greater than the idle pressure.

10. The method according to claim 9, further comprising:

receiving, by the controller, an indication that an operational condition is satisfied; and discontinuing the idle signal such that a return flow of hydraulic fluid is permitted to drain from the pressure control chamber to depressurize the pressure control chamber, thereby permitting the servo piston to move the swashplate to the forward position.

11. The method according to claim 10, wherein the operational condition comprises at least one of an ambient temperature being exceeded, an engine compartment temperature being exceeded, or a running time having elapsed.

12. The method according to claim 9, wherein the idle signal has a first current, and the reverse signal having a second current, the second current being greater than the first current, and the first current and the second current being proportional to the idle pressure and the reverse pressure.

13. An electro-hydraulic valve for a fan control system, the electro-hydraulic valve comprising:
- an adaptor, the adaptor defining a control port, a pump port, a tank port, and a longitudinal passage, the control port, the pump port, and the tank port each being in communication with the longitudinal passage;
- a spool, the spool being disposed within the longitudinal passage of the adaptor and being reciprocally movable over a range of travel between a tank flow position and a pump flow position,
  - when the spool is in the tank flow position, the tank port and the control port are in fluid communication with each other, and the pump port is fluidly isolated from both the tank port and the control port, and
  - when the spool is in the pump flow position, the pump port and the control port are in fluid communication with each other, and the tank port is fluidly isolated from both the pump port and the control port;
- a spring, the spring interposed between the adaptor and the spool to bias the spool to the tank flow position; and
- a solenoid assembly, the solenoid assembly including a coil and an armature, the armature movable in response to an electrical current being transmitted through the coil, the armature arranged with the spool such that the armature moves the spool from the tank flow position toward the pump flow position in an amount proportional to the electrical current transmitted through the coil;
- the spool includes an external spool surface having a circumferential groove,
  - the circumferential groove in communication with the control port,
  - the circumferential groove configured to be in communication with the tank port when the spool is in the tank flow position to fluidly connect the control port and the tank port,
  - the circumferential groove configured to be in communication with the pump port when the spool is in the pump flow position to fluidly connect the control port and the pump port, and
  - the circumferential groove configured to be in variable communication with the pump port based upon a location of the spool between the tank flow position and the pump flow position;
- wherein the adaptor has an adaptor length, and the spool has a spool length, the spool length being at least fifty percent of the adaptor length, wherein the spool includes an internal spool surface defining a longitudinal blind bore in communication with the control port and a cross bore in communication with the longitudinal blind bore, and wherein the circumferential groove is in communication with the cross bore.

14. The electro-hydraulic valve according to claim 13, wherein the external spool surface of the spool has a supply land and a tank land with the circumferential groove defined therebetween,
- the supply land being configured to fluidly isolate the pump port from both the control port and the tank port when the spool is in the tank flow position,
- the tank land being configured to fluidly isolate the tank port from both the pump port and the control port when the spool is in the pump flow position,
- the supply land of the spool having a supply land length, and
- the circumferential groove of the spool having a groove length,
- the supply land length being less than the groove length.

15. The electro-hydraulic valve according to claim 13, wherein the control port of the adaptor has a first diameter, and the longitudinal blind bore of the spool has a second diameter, the second diameter being less than half of the first diameter.

* * * * *